Patented Aug. 28, 1928.

1,682,292

UNITED STATES PATENT OFFICE.

LEON LILIENFELD, OF VIENNA, AUSTRIA.

CELLULOSE DERIVATIVE AND PROCESS FOR PRODUCING SAME.

No Drawing. Application filed July 23, 1924, Serial No. 727,803, and in Austria April 4, 1924.

In the British specification No. 138116 there is described a process for the manufacture of cellulose compounds which, in the form of their neutral salts of an alkali metal, are soluble in water, this process consisting in acting on cellulose with chloracetic acid or with a homologue thereof, in presence of an alkali and an alcohol; on completion of the reaction the cellulose compounds are isolated by neutralizing the mixture and by adding alcohol, or the like, and the final products (a residue or a precipitate according to whether alcohol has been added to the reaction mixture itself or to a solution thereof) are freed from their salts and alkalies by washing with dilute alcohol. The final products may be used as substitutes for gelatine.

According to the present invention cellulose derivatives with totally different, technically valuable properties, may be obtained by allowing the reaction to occur between cellulose, an alkali, and a halogen derivative of a fatty acid in the absence of alcohol, or in the presence of not more than 20 parts by weight of absolute alcohol for each hundred parts by weight of water present, and by conducting the process so that the permissible maximum quantity of halogen fatty acid used is inversely proportional to the strength of the alkali solution used, that is to say, so that the maximum quantity of halogen fatty acid used is increased proportionately as the concentration of the alkali solution decreases and is decreased proportionately as the concentration of the alkali solution is increased.

According to a further feature of the invention, it is desirable to use not more than about $$\frac{18a}{a^2}$$

molecular proportions of a monohalogen fatty acid for each molecular proportion of caustic alkali present, wherein $a$ represents the percentage strength of the alkali solution, that is to say, the number of parts by weight of alkali (reckoned as caustic soda) contained in one hundred parts by weight of the alkali solution. If, for instance, the caustic soda solution is of 18 per cent strength, then the quantity of the halogen fatty acid to be used should not exceed about $$\frac{18 \times 18}{18^2},$$

that is, one molecular proportion, for each molecular proportion of caustic soda used, and if, for instance, there is used a caustic soda solution of 30 per cent strength, then the quantity of the halogen fatty acid to be used should not exceed about $$\frac{18 \times 30}{30^2},$$

that is about 0.6 molecular proportion of halogen fatty acid for each molecular proportion of caustic soda used.

According to another feature of the invention, the maximum quantity of halogen fatty acid should be regulated, not only according to the strength of the alkali solution alone, but also according to the quantity thereof, and this relation between the permissible maximum quantity of halogen fatty acid and the concentration of the alkali solution, on the one hand, and the quantity of alkali solution used on the other hand, is based on the fact that when a weaker solution is used (for instance, one containing up to about 25 per cent of alkali calculated as caustic soda) the upper limit of the quantity of the halogen fatty acid which may be used must rise proportionally as the quantity of the alkali solution used increases, whilst when a stronger alkali solution is used (for instance, one containing more than 25 per cent of alkali reckoned as caustic soda) the said limit must be decreased proportionally as the quantity of the alkali solution used increases. As a rule, when using an alkali solution of strength not more than about 25 per cent (reckoned as caustic soda) there should be used not more than about $$\frac{180(n+1)}{a^2}$$

molecular proportions of the halogen fatty acid for each molecular proportion of caustic alkali used, and when using an alkali solution of a strength exceeding 25 per cent (reckoned as caustic soda), there should be used not more than about $$\frac{60}{a(n+1)}$$

molecular proportions of the halogen fatty acid for each molecular proportion of caustic alkali used, wherein $a$ represents the percentage strength of the alkali solution (reckoned as caustic soda), and $n$ represents the number of parts by weight of the alkali solution which is used for each part by weight of air-dried cellulose. Thus if, for instance, there is used a soda-cellulose containing two parts by weight of caustic soda solution of 18 per cent strength to each one part by weight of cellulose, then the maximum limit for the quantity of halogen fatty acid which may be used will be $$\frac{180(2+1)}{18^2}=1.66$$

molecular proportions for each molecular proportion of caustic soda. If, however, there is used a soda-cellulose which contains 3 parts by weight of caustic soda solution of 30 per cent strength for each one part by weight of cellulose, then the maximum quantity of the halogen fatty acid which may be used will be $$\frac{60}{30(3+1)}=0.5$$

molecular proportion for each one molecular proportion of caustic soda.

In practice it is not necessary to use a quantity of halogen fatty acid which approaches the maximum limit permissible according to the aforesaid rules. As experience is gained, useful products may be obtained in fair yield by using a quantity of halogen fatty acid considerably below the above maximum limit. Generally, it may be said, that when using an alkali solution containing up to about 25 per cent of alkali (reckoned as caustic soda) not more than about 0.75 to 1 molecular proportion of a monohalogen fatty acid should be used for each molecular proportion of alkali and, when using an alkali solution containing more than 25 per cent of alkali (reckoned as caustic soda) not more than about 0.5 to 0.6 molecular proportion of a monohalogen fatty acid should be used for each molecular proportion of caustic alkali. Experience shows that when using alkali solutions which correspond with a caustic soda solution containing up to 25 per cent of caustic soda, it is possible to use, with good results, a quantity of halogen fatty acid less than one molecular proportion for each one molecular proportion of alkali used, and when using an alkali solution which contains more than 25 per cent of alkali (reckoned as caustic soda), a quantity of halogen fatty acid which is less than 0.5 molecular proportion for each one molecular proportion of alkali used.

With respect to the proportion of the halogen fatty acid to the cellulose, it may be taken as an important rule, that excellent results are obtainable by using not more than about one molecular proportion of the halogen fatty acid for each molecular proportion of cellulose ($C_6H_{10}O_5$).

Naturally, if we deal with the free halogen fatty acid and not with a neutral salt thereof, it is necessary, in determining the admissible maximum quantity of halogen fatty acid, to consider as the strength of the alkali solution, the percentage of alkali which it will contain after deducting the quantity of alkali neutralized by the halogen fatty acid. If the halogen fatty acid or salt thereof be used in aqueous solution, then the water contained in its solution must be taken into account in calculating the strength and quantity of the alkali solution.

If the working conditions and proportions laid down above are observed, there may be obtained cellulose derivatives which exhibit the following technically valuable properties: They are insoluble in water, but are soluble in aqueous alkalies and may be precipitated from a solution in an alkali by adding an agent capable of neutralizing the alkali, such as an acid, an acid salt or the like; the precipitation may occur whilst the solution is still alkaline, and will certainly occur as soon as it becomes neutral. If the solution in aqueous alkali be treated with alcohol, then precipitates are obtained which, after removing the free alkali by washing with dilute alcohol (for instance of 50–90 per cent strength) are insoluble in water. They therefore yield no neutral water-soluble salts of alkali metals. The alkaline solutions or pastes of the new cellulose derivatives yield, if brought into a suitable form and treated with an appropriate precipitating agent, such as an acid, a salt, and acid and a salt, an acid salt, an alcohol or the like, transparent products such as films, threads and the like, which, after washing and drying, are solid and flexible. Consequently the new cellulose derivatives are suitable for many technical purposes for which the cellulose compounds, hitherto obtained by reacting on cellulose with a halogen fatty acid in the presence of an alkali, are unsuitable.

The new cellulose derivatives may be worked up either alone, or mixed with other colloids or binding agents which are soluble in water or in aqueous alkali, into a whole series of industrial products such as artificial fibres (for instance, artificial silk), films, plates, plastic substances, coatings and layers of every description, fabric dressings insoluble in water, sizing for spun materials, thickening agents for textile printing, fixing agents for pigments, binding materials, book cloth and the like.

The new cellulose compounds are in many respects superior to the hitherto known cellulose derivatives which are soluble in alkali and insoluble in water. They are superior to the cellulose-xanthates in their durability both in the solid and dissolved condition, their absence of color, their freedom from by-products and impurities, the greater readiness with which they may be precipitated in the form of shaped articles (for instance, even by a dilute organic acid), in the fact that they can be precipitated by means of an acid without liberation of hydrogen sulphide and separation of sulphur, the stability of their solutions and the fact that such solutions may be used immediately after precipitation, and in the fact that they can be produced from odorless, incombustible and non-poisonous parent materials. As compared with the alkyl cellulose derivatives, soluble in alkali and insoluble in water (see British specifications Nos. 177,810, 203,346, and 203,347), the new cellulose derivatives possess the advantages that they may be produced without any extraneous supply of heat and therefore with less risk of depolymerizing the cellulose molecule, that they may be produced more economically and simply, that they are resistant towards water, that is to say the products made therefrom show less tendency to swell, and are more flexible and stronger in the dry state.

The new substances are probably hydroxy-paraffin-monocarboxylic acid derivatives of cellulose in which the cellulose has entered into the hydroxyl group of a hydroxy-paraffin-monocarboxylic acid (possibly with the formation of a lactone or a lactide). Consequently under treatment with a concentrated hydro-halogen acid (such as hydriodic acid or hydrochloric acid), with phosphorus iodide and water, or with a dilute hydro-halogen acid under pressure, they decompose with the elimination of the hydroxy-paraffin-monocarboxylic acid in question.

The process may be applied in a very simple manner. It consists essentially in treating bleached or unbleached cellulose, or a substance containing cellulose, or a conversion product of cellulose in the presence of an alkali but in the absence of alcohol or in the presence of at the most 20 parts by weight of alcohol for every 100 parts by weight of water present, with a mono-halogen derivative of a fatty acid or a salt or derivative thereof, (for instance, an ester), in either dissolved or undissolved state. This treatment may be carried out at room temperature or below it, or with the application of heat.

The alkali may be added either by soaking the cellulose in an excess of a solution of alkali and removing the excess of alkali solution by pressing, centrifuging or the like, or by mixing or kneading the cellulose with the required quantity of alkali solution, or by mixing or kneading the cellulose or alkali-cellulose with solid caustic alkali, or with a mixture of solid caustic alkali with a saturated alkali solution.

The reaction mixture after the reaction is completed, may be treated for instance, by dissolving it by adding water (if a sufficient excess of unused alkali remains) or by adding dilute alkali solution (for instance, a caustic soda solution of 3–10 per cent strength) and using for technical purposes the solution or paste so obtained if necessary after previously removing any undissolved substance present by straining or filtering or the like. The product, however, may also be separated from the reaction mixture in various ways. For instance, the two following methods may be mentioned: The reaction mixture, optionally after neutralizing the free alkali or after acidifying (especially when there is present a large amount of free alkali), is washed with water and the residue dried, if desired, after previously dehydrating it with alcohol. Or the reaction mixture may be dissolved by adding water or dilute alkali solution to the solution of the cellulose derivative, if necessary, filtered, strained or centrifuged, and treated with an acid or with any other agent capable of fixing the alkali (for instance, an ammonium salt) in sufficient quantity for complete precipitation of the product, or in excess; the precipitate is then thoroughly washed with water, and, if desired, dried. The substance however isolated may be purified by dissolving it in alkali and precipitating it by means of an acid or the like.

The following examples illustrate the invention, the parts being by weight:—

1. 100 parts of sulphite-cellulose (in fleece- or sheet-form) or linters are soaked in 1000 to 2000 parts of a caustic alkali solution of 18 per cent strength at 15° C. to 20° C., and allowed to stand in a tightly closed vessel for 3 to 24 hours at room temperature. The material is then reduced to 350 parts by pressing or centrifuging and is ground until uniform in a shredder, preferably while cooling, or in a willowing machine or vertical mill. The soda-cellulose, either immediately after grinding or after maturing for a long or short period (for instance, 3 to 72 hours), is treated in a vessel, which is advantageously provided with a suitable stirring, kneading, or mixing device, with 30 to 50 parts of monochloracetic acid which has been dissolved in a small quantity of water (for instance, in an amount equal to the weight of the chloracetic acid or to half that weight). Instead of free chloracetic acid, there may be used an equivalent quantity of its sodium or potassium salt (for instance, by dissolving the acid in its own weight of water, neutralizing the mixture with solid sodium bicarbonate and incorporating the crystalline suspension with the soda-cellulose, either as it is or after dissolving it by adding water). The chloracetic acid or salt thereof may be added all at once or in small portions. In order to obtain as uniform a distribution as possible of the chloracetic acid or salt thereof, it is desirable to knead, triturate, stir or agitate the mixture during the addition. After the acid has been stirred or kneaded into the mixture, the latter is further kneaded or stirred for some time (for instance, from half-an-hour to 2 hours).

By taking samples at short intervals it may be shown that after a comparatively short time (for instance, after a few hours), the substance has become soluble at least to a great extent in a dilute caustic soda solution (for instance of 5-10 per cent strength). The reaction mixture, which has the appearance of unchanged soda-cellulose, is practically insoluble in water. It is then dissolved in dilute caustic soda solution for instance of 4-8 per cent strength, either immediately or after it has been allowed to stand for 10 to 30 hours, and either alone or after previously neutralizing it, or acidifying and washing it, or merely washing it, and may be used for a technical purpose, or the reaction product in it may be isolated. With this object, the reaction mixture is dissolved in 6000 to 12000 parts of caustic soda solution of 5-8 per cent strength, any insoluble material is removed by filtering, straining, centrifuging or the like, and the solution treated with a dilute acid, for instance, sulphuric acid or acetic acid of 12-20 per cent strength, until the cellulose-glycollic acid has been completely precipitated.

The substance which separates in thick flakes or lumps, is then separated from the mother liquor by means of a filtering device (such as a filter press, strainer, filter or the like), washed with water until free from acid or salt and dried at atmospheric or reduced pressure, if necessary after previously dehydrating it with alcohol and washing with ether. After grinding, it forms a white powder, insoluble in water and in organic solvents, but soluble in dilute alkali, for instance, a caustic soda solution of 5-8 per cent strength. A solution of the substance in caustic soda solution (for instance of 5 to 10 per cent strength) is clear and viscous and, when spread on a glass plate and treated with a dilute acid or with any precipitating agent known in the viscose industry, yields a clear, tough film which, after washing and drying, is transparent and flexible.

If the substance is dissolved in dilute caustic soda solution, for instance, of 8 per cent strength, and the clear solution treated with alcohol, there is obtained a precipitate which after washing with dilute alcohol (for instance of 50 to 80 per cent strength) is insoluble in cold or in hot water.

If normal sulphuric acid be added drop by drop to a solution of one gram of the substance in 60 grams of a normal solution of caustic soda, a precipitate is produced when the content of caustic soda is about 73 per cent calculated on the substance and 1.07 per cent calculated on the solution.

If the substance is decomposed by means of hydriodic acid or by boiling with concentrated hydrochloric acid or even by heating with diluted hydrochloric acid under pressure, then it yields glycollic acid, which may easily be identified for instance, by its well known conversion to oxalic acid on oxidation with nitric acid.

2. The procedure is as in Example 1, with the difference that instead of a caustic soda solution of 18 per cent strength there is used a caustic soda solution of 30 per cent strength.

Owing to the presence of the larger percentage of unused alkali, the reaction mixture dissolves at least to a great extent after complete conversion, on the addition of water alone. For dissolving the product for the purpose of working it up or isolating it there may be used, if desired, a dilute caustic soda solution (for instance, of 2 to 4 per cent strength), or even water alone. Upon the addition of acid, as in Example 1 precipitation occurs even while the reaction is alkaline, and most satisfactorily when it is neutral.

The appearance and properties of the cellulose-glycollic acid so obtained resemble those of the product obtained as described in Example 1.

3. The procedure is as in Example 1 or 2, with the difference that instead of mono-chlor-acetic acid there are used 7 to 12 parts of methyl-chloracetate or 9 to 14 parts of ethyl-chloracetate. The products are similar to those of Examples 1 and 2.

4. If in the foregoing examples, there be used instead of the chloracetic acid or the chloracetic ester, an equivalent amount or other quantity within the limits herein defined of a halogen derivative of a homologue of acetic acid, for instance, α-bromo-propionic acid, bromo-succinic acid or α-bromo-isobutyric acid or the like or an alkali salt or an ester thereof, there are obtained by the same mode of working, final products (cellulose-lactic acid or celluloseoxysuccinic acid or cellulose-oxyisobutyric acid), which have similar properties as the cellulose-glycollic acid obtained as described in Examples 1 and 2.

In the above examples the degree of reduction of the mass of the soda-cellulose by pressing may be varied as desired (for example to 2, 3, 4, or 6 parts calculated on 1 part of cellulose).

In order to accelerate the reaction, the soda-cellulose used as parent material may be heated, or the reaction mixture may be heated. There may also be added to the reaction mixture a contact substance, such as copper, iron, silver, benzoyl-superoxide or the like. The process may also be conducted in presence of alcohol (for instance an amount of 10 per cent calculated on the water present may be added to the caustic soda solution, or to the chloracetic acid or salt thereof).

Instead of bleached or unbleached cellulose there may be used as parent material a conversion product of cellulose insoluble in alkali (for instance, a cellulose hydrated or hydrolyzed by a chemical action, such as by mercerization with subsequent washing and, if necessary, drying, by the action of a strong mineral acid, by heating with a weak mineral acid, or by treatment with a zinc halide, or by a mechanical process such as grinding in the presence of water, or the like, or an oxycellulose insoluble in alkali) in short, any body of the cellulose group which has been proposed for the production of viscose or of ammonical copper-oxide-cellulose.

In the description and claims wherever the context permits the expression "cellulose" includes all bodies here mentioned belonging to the cellulose group.

In the specification and claims the expression "halogen fatty acid" or monohalogen fatty acid" includes, wherever the context permits, monochlor-, monobrom- and monoiodo-fatty acids themselves, their derivatives (such as esters) and their salts, as well as substances and mixtures of substances which yield, in the reaction mixture, monohalogen fatty acids or their derivatives.

The expression " in the form of unshaped products" used in the claims includes: flakes, powder, sand, crumbs, grains, solutions, pastes, or the like.

I claim:

1. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from free alkali by washing with aqueous alcohol, yield products which are insoluble in water, which process comprises treating cellulose in the presence of an alkali with a monohalogen fatty acid in the absence of more than substantially 20 parts by weight of absolute alcohol to every 100 parts by weight of water present.

2. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali with a monohalogen fatty acid in the absence of more than substantially 20 parts by weight of absolute alcohol to every 100 parts by weight of the water present, and in using not more than $$\frac{18a}{a^2}$$

molecular proportions of the monohalogen-fatty acid for each molecular proportion of caustic alkali present, where $a$ represents the percentage strength of the alkali solution, that is, the quantity of caustic alkali (calculated as caustic soda), which is contained in 100 parts by weight of the alkali solution used.

3. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali solution with a monohalogen fatty acid in the absence of more than substantially 20 parts by weight of absolute alcohol to every 100 parts by weight of water present, and in using in the presence of the solution of alkali if it contains less than 25 per cent of alkali (calculated as caustic soda) not more than 1 molecular proportion of the monohalogen fatty acid for each molecular proportion of caustic alkali used, and in the presence of the solution of alkali if it contains more than 25 per cent of alkali, not more than 0.6 molecular proportion of the monohalogen fatty acid for each molecular proportion of caustic alkali used.

4. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali solution with a monohalogen fatty acid in the absence of more than substantially 20 parts by weight of absolute alcohol to every 100 parts by weight of the water present, and in using in the presence of the solution of alkali if it contains at most 25 per cent of alkali (calculated as caustic soda), not more than $$\frac{180(n+1)}{a^2}$$

molecular proportions of the halogen fatty acid for each molecular proportion of caustic alkali used, and in the presence of the solution of alkali if it contains more than 25 per cent of alkali (calculated as caustic soda), not more than $$\frac{60}{a(n+1)}$$

molecular proportions of halogen fatty acid for each molecular proportion of caustic alkali used, where $a$ represents the percentage strength of the alkali solution that is the quantity of caustic alkali (calculated as caustic soda), which is contained in 100 parts by weight of the alkali solution, whilst $n$ represents the quantity by weight of the alkali solution used for each part by weight of the air-dry cellulose.

5. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali solution with a monohalogen fatty acid in the absence of more than substantially 20 parts by weight of absolute alcohol to every 100 parts by weight of water present, and in using in the presence of the solution of alkali if it contains at most 25 per cent of alkali (calculated as caustic soda), less than 0.75 to 1 molecular proportion of the halogen fatty acid for each molecular proportion of caustic alkali used, and in the presence of the solution of alkali if it contains more than 25 per cent of alkali (calculated as caustic soda), less than from 0.5 to 0.6 molecular proportion of the halogen fatty acid for each molecular proportion of caustic alkali used.

6. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali with a monohalogen fatty acid in the absence of more than substantially 20 parts by weight of absolute alcohol to every 100 parts by weight of water present, and in using not more than 1 molecular proportion of the monohalogen fatty acid for each molecular proportion of cellulose reckoned as $C_6H_{10}O_5$.

7. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali with a monohalogen fatty acid in the absence of more than substantially 20 parts by weight of absolute alcohol to every 100 parts by weight of water present and then dissolving in alkali the crude mixture containing the product of the reaction which, when the mixture itself contains a considerable excess of alkali, may be done by adding water.

8. Process for the manufacture of cellulose derivatives which dissolve in aqueous alkalies and are precipitated from their solutions in aqueous alkalies by the addition of an agent which neutralizes the alkali even when the reaction is still alkaline and certainly when it is neutral and by treatment of their solutions in alkalies with alcohol, and freeing the precipitates so obtained from alkali by washing with aqueous alcohol, yield products which are insoluble in water, which process comprises treating cellulose in the presence of an alkali with mono-chloracetic acid in the absence of more than substantially 20 parts by weight of absolute alcohol to every 100 parts by weight of the water present.

9. As new products, hydroxy-paraffin-monocarboxylic acid derivatives of cellulose in the form of unshaped products which dissolve in aqueous alkalies and are precipitated from their solution in aqueous alkalies by the addition of an agent which neutralizes the alkali even when the reaction is still alkaline, and certainly when it is neutral, and which, by treating their solutions in alkalies with alcohol and freeing the precipitates so obtained from free alkali by washing with aqueous alcohol, yield products which are insoluble in water.

10. As new products, glycollic acid derivatives of cellulose in the form of unshaped products which dissolve in aqueous alkalies and are precipitated from their solutions in aqueous alkalies by the addition of an agent which neutralizes the alkali even when the reaction is still alkaline, and certainly when it is neutral, and which, by treating their solutions in alkalies with alcohol and freeing the precipitates so obtained from free alkali by washing with aqueous alcohol, yield products which are insoluble in water.

11. As new products, cellulose derivatives in the form of unshaped products which dissolve in aqueous alkalies and are precipitated from their solutions in aqueous alkalies by the addition of an agent which neutralizes the alkali even when the reaction is still alkaline, and certainly when it is neutral, and which, by treating their solutions in alkalies with alcohol and freeing the precipitates so obtained from free alkali by washing with aqueous alcohol, yield products which are insoluble in water, in which derivatives a hydroxy-paraffin-mono-carboxylic acid can be detected on decomposition with a hydro-halogen acid.

12. As new products, derivatives of cellulose in the form of unshaped products which dissolve in aqueous alkalies and are precipitated from their solutions in aqueous alkalies by the addition of an agent which neutralizes the alkali even when the reaction is still alkaline, and certainly when it is neutral, and which, by treating their solutions in alkalies with alcohol and freeing the precipitates so obtained from free alkali by washing with aqueous alcohol, yield products which are insoluble in water, in which derivatives glycollic acid can be detected on decomposition with a hydro-halogen acid.

13. The process for manufacturing cellulose derivatives which dissolve in aqueous alkalies and are precipitated from their solutions in aqueous alkalies by the addition of an agent which neutralizes the alkali even when the reaction mixture is still alkaline and certainly when it is neutral and by treatment of their solutions in alkalies with alcohol, and freeing the precipitate so obtained from alkali by washing with aqueous alcohol, yield products which are insoluble in water, which process comprises treating cellulose in the presence of caustic alkali with a monohalogen fatty acid in the presence of from and including zero to at most substantially 20 parts by weight of absolute alcohol to every 100 parts of water.

In testimony whereof I affix my signature.

Dr. LEON LILIENFELD.